US009702306B2

(12) United States Patent
Gehret et al.

(10) Patent No.: US 9,702,306 B2
(45) Date of Patent: Jul. 11, 2017

(54) INTERNAL COMBUSTION ENGINE CONTROLLER

(71) Applicant: Tecogen Inc., Waltham, MA (US)

(72) Inventors: Joseph Gehret, Waltham, MA (US); Jean Roy, Waltham, MA (US); Jian Wen, Waltham, MA (US)

(73) Assignee: Tecogen Inc., Waltham, MA (US)

( * ) Notice: Subject to any disclaimer, the term of this patent is extended or adjusted under 35 U.S.C. 154(b) by 93 days.

(21) Appl. No.: 14/881,557

(22) Filed: Oct. 13, 2015

(65) Prior Publication Data

US 2017/0101942 A1 Apr. 13, 2017

(51) Int. Cl.
| | |
|---|---|
| *G06F 19/00* | (2011.01) |
| *F02D 31/00* | (2006.01) |
| *F02B 63/04* | (2006.01) |
| *G05B 15/02* | (2006.01) |

(52) U.S. Cl.
CPC ............ *F02D 31/001* (2013.01); *F02B 63/04* (2013.01); *G05B 15/02* (2013.01); *F02D 2200/101* (2013.01)

(58) Field of Classification Search
CPC  F02D 2009/023; F02D 41/083; B60W 10/04; B60L 2240/10
USPC ............ 701/22, 54, 101; 123/681, 687, 698; 180/65.21, 65.24, 65.28, 65.285
See application file for complete search history.

(56) References Cited

U.S. PATENT DOCUMENTS

| | | | |
|---|---|---|---|
| 3,949,359 A | 4/1976 | Sorkin | |
| 4,209,829 A | 6/1980 | Leichle | |
| 4,617,890 A | 10/1986 | Kobayashi et al. | |
| 6,879,053 B1 | 4/2005 | Welches et al. | |
| 2005/0080527 A1* | 4/2005 | Tao | F16H 59/38 701/31.1 |
| 2005/0080535 A1* | 4/2005 | Steinmetz | B60W 10/02 701/51 |
| 2005/0080537 A1* | 4/2005 | Cawthorne | B60K 6/445 701/51 |
| 2005/0080540 A1* | 4/2005 | Steinmetz | B60K 6/445 701/55 |
| 2005/0080541 A1* | 4/2005 | Sah | B60K 6/387 701/67 |
| 2005/0140142 A1 | 6/2005 | Welches et al. | |
| 2005/0189918 A1* | 9/2005 | Weisgerber | G01R 31/006 320/132 |

(Continued)

FOREIGN PATENT DOCUMENTS

| | | |
|---|---|---|
| EP | 1761984 A2 | 3/2007 |
| WO | WO2015092480 A1 | 6/2015 |

OTHER PUBLICATIONS

EPO, "Extended European Search Report—App. No. 16002163.0-1603", Mar. 14, 2017, European Patent Office.

*Primary Examiner* — John Kwon
(74) *Attorney, Agent, or Firm* — Intrinsic Law Corp.

(57) ABSTRACT

A system and method for controlling an internal combustion engine and electrical inverter system for powering a load, including controlling the operation of a spark-ignited internal combustion engine prime mover used in generation of electrical power by way of a generator. A microprocessor (e.g., DSP) controlled circuit taking engine speed input from an engine speed signal is used to control the operation of the internal combustion engine prime mover so that it is preferably operated substantially at wide open throttle.

7 Claims, 7 Drawing Sheets

(56) References Cited

U.S. PATENT DOCUMENTS

| | | | |
|---|---|---|---|
| 2005/0255964 A1* | 11/2005 | Heap | B60K 6/445 |
| | | | 477/3 |
| 2005/0256623 A1* | 11/2005 | Hubbard | B60L 11/123 |
| | | | 701/54 |
| 2007/0069521 A1 | 3/2007 | Jabaji et al. | |
| 2009/0084618 A1* | 4/2009 | Thompson | B60K 6/445 |
| | | | 180/65.8 |
| 2013/0179052 A1 | 7/2013 | Kawakami et al. | |
| 2015/0066438 A1 | 3/2015 | Brooks et al. | |

* cited by examiner

INTERNAL COMBUSTION ENGINE CONTROLLER

TECHNICAL FIELD

The present application relates to controllers and control circuits for controlling an internal combustion engine, including a gas fired internal combustion prime mover used for driving a generator for generating electrical power.

BACKGROUND

Modern internal combustion engines are commonly controlled by a control circuit, which typically includes a microprocessor and programmed instructions to control the speed and other parameters of the running of the engine. In motor vehicles (e.g., cars and trucks) the internal combustion engines are operated according to an engine management system of hardware and software programmed by the manufacturer of the vehicle. After market modifications of the engine management circuits and software are sometimes carried out to achieve desired performance results or variations on the operation of the basic engine characteristics.

Similarly, engines (prime movers) used in electrical power generation systems are controlled and monitored by electronic circuits and programmed instructions running in the circuits. Inputs such as engine revolutions per minute (RPM), operational temperatures, pressures, fuel and air intake rates and concentrations of certain exhaust gases can all be used in addition to the operator's inputs to control and drive an engines.

Existing engine controllers and control circuits (collectively "engine controllers") come in a variety of configurations. Many engine controllers are prone to environmental effects due to the adverse physical conditions in which the engine controllers are disposed. For example, engine controllers can be subjected to temperature extremes and other conditions such as high humidity, contamination and vibration. Modern circuitry in engine controllers can be susceptible to damage from such environmental effects and the reliability or life of an engine controller can suffer as a result. The end result of a failed engine controller can vary from non-optimal engine operation to catastrophic damage to the engine and associated equipment or even personal injury to engine operators. In some applications space is at a premium and an engine controller must occupy as little space as possible, which factors into the design of the controller in some applications. Additionally, economics are a factor that needs to be taken into consideration in the design of engine controllers so that the overall commercial engine and control system is built to conserve design, materials and manufacturing costs thereof.

Accordingly, a number of motives for improving engine controllers inform the present disclosure of an engine controller, especially an engine controller for a prime mover of an electrical generator or an engine used for co-generation of power and heat in a multifunctional system design.

SUMMARY

This disclosure is directed to controllers and control circuits for controlling an internal combustion engine, including a gas fired internal combustion prime mover used for driving a generator for generating electrical power. This design can be used for engine controllers for internal combustion engines used to drive electrical generators (feeding an electrical load, e.g., grid, AC or DC bus and associated loads).

Aspects of the invention include a controller for controlling engine speed of a prime mover engine in an electrical generation system, including a housing for containing a plurality of electrical parts of said controller; an engine speed processor that senses a movement of said prime mover engine and generates a first engine speed signal; an input speed processor that receives said first engine speed signal and generates a second engine speed signal corresponding at least in part to said first engine speed signal; an engine metering circuit that receives said second engine speed signal and relates said second engine speed signal to a clock signal and stores engine revolutions (RPM) and other data relating to the speed of said engine in at least one memory storage unit; a digital signal processor (DSP) controller coupled to said engine metering circuit by at least one multi-pin connection so as to permit said DSP to access said at least one memory storage unit on said engine metering circuit; and a host communication interface receiving signals from said DSP over a communication bus and further providing an output control signal for controlling the speed of said engine.

IN THE DRAWINGS

For a fuller understanding of the nature and advantages of the present invention, reference is made to the following detailed description of preferred embodiments and in connection with the accompanying drawings, in which.

DETAILED DESCRIPTION

As stated earlier, improvements in engine controller design can offer better durability, life span, efficiency and economy of an engine and/or engine-generator system. Such systems are employed for example in motor-generator pairs or in electric and heat co-generation systems. A particular but non-limiting use of the present engine controller is for engines operated at or substantially at wide-open throttle, a method of operation found by the present applicants to offer effective use of internal combustion engines in the above applications.

Figure 1:
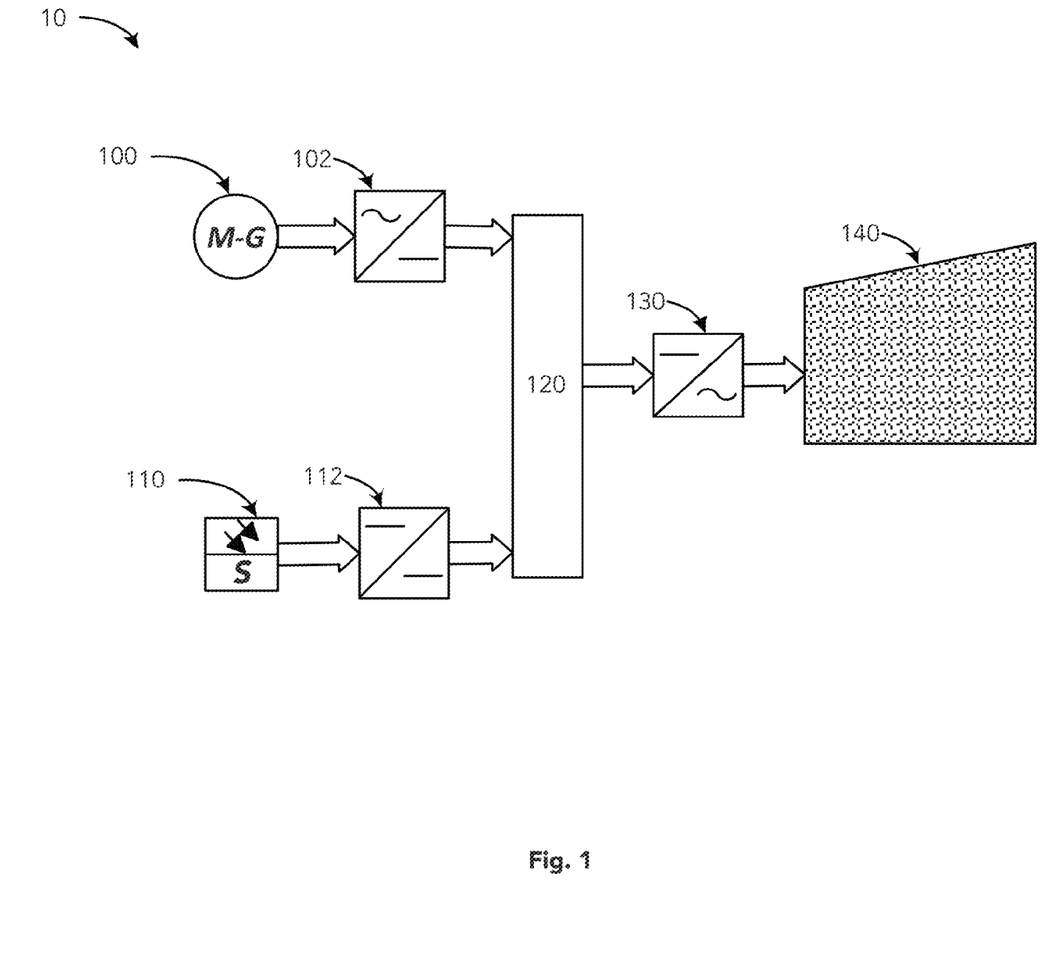
FIG. 1 illustrates an exemplary architecture for generation, transformation and delivery of electrical power to a load.

FIG. 1 illustrates a motor-generator and other (e.g., solar, battery) power generation system 10. The motor-generator 100 outputs alternating current (AC) electrical power, which is converted to direct current (DC) electrical power in AC-to-DC Converter (ACDC) 102. Solar collector generation system 110 generates DC electrical power output, which may be transformed or conditioned as needed in DC-to-DC Converter (DCDC) 112. The DC outputs from ADC 102 and DDC 112 are delivered to a common DC bus 120. A DC-to-AC Converter (DCAC) 130 transforms the DC power from the common bus 120 to AC electrical power provided to a load 140. The load 140 may be an electrical grid, customer facility, industrial or residential infrastructure, or an islanding load.

Figure 2:
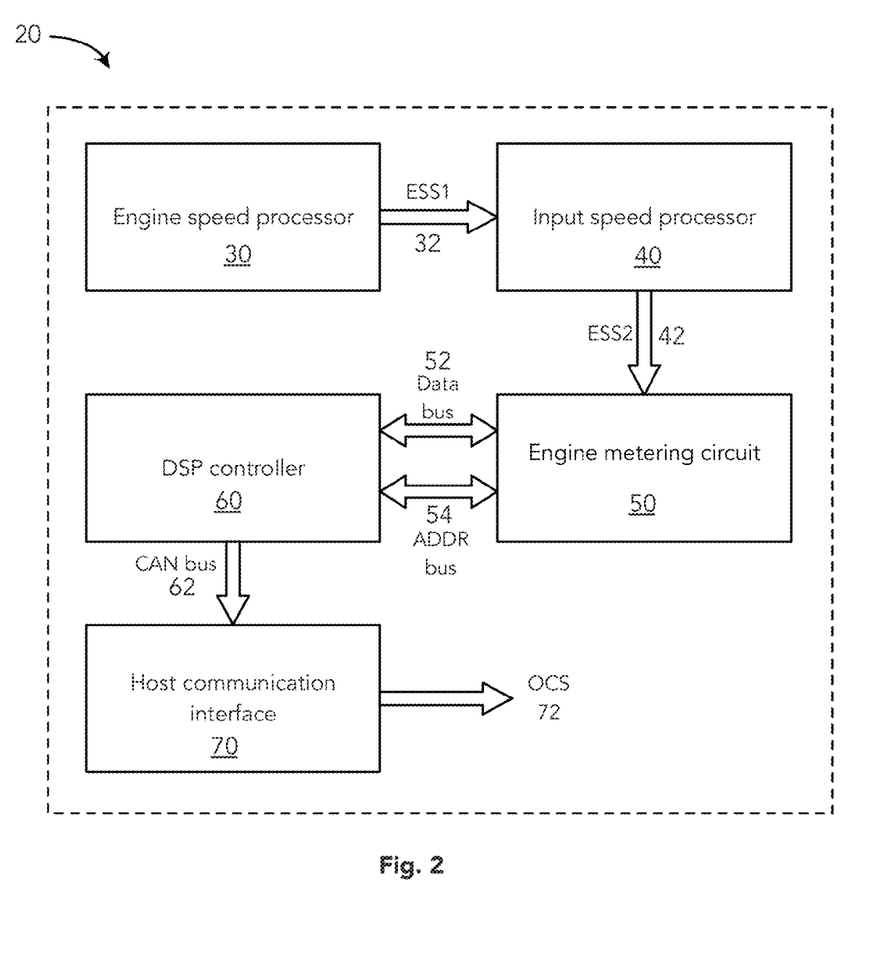
FIG. 2 illustrates a representation of an engine controller.

FIG. 2 illustrates an architecture for an internal combustion engine controller 20 according to one or more embodiments of the invention. Some components of controller 20 will be discussed in further detail below.

An engine speed processor or circuit 30 is employed to generate an engine speed signal 32 corresponding to the rotational (e.g., revolutions per minute or equivalent) speed of the internal combustion prime mover (engine). The engine speed signal 32 is provided from engine speed processor or circuit 30 to an input speed processor or circuit 40, which in turn outputs an engine speed input signal 42 for use in other portions of the controller 20. Engine metering circuit 50 receives numerous signals at its input bus or input pin interface including the engine speed input signal 42. A shared data bus 52 and a shared address (ADDR) bus 54 are disposed between the engine metering circuit 50 and a digital signal processor (DSP) controller or circuit 60. DSP controller 60 processes the inputs relating to engine performance and speed from the other components and sensors of the system and outputs a CAN bus signal(s) 62 sent through a host communication interface circuit 70 to a host controller as host controller signal 72.

Figure 3:
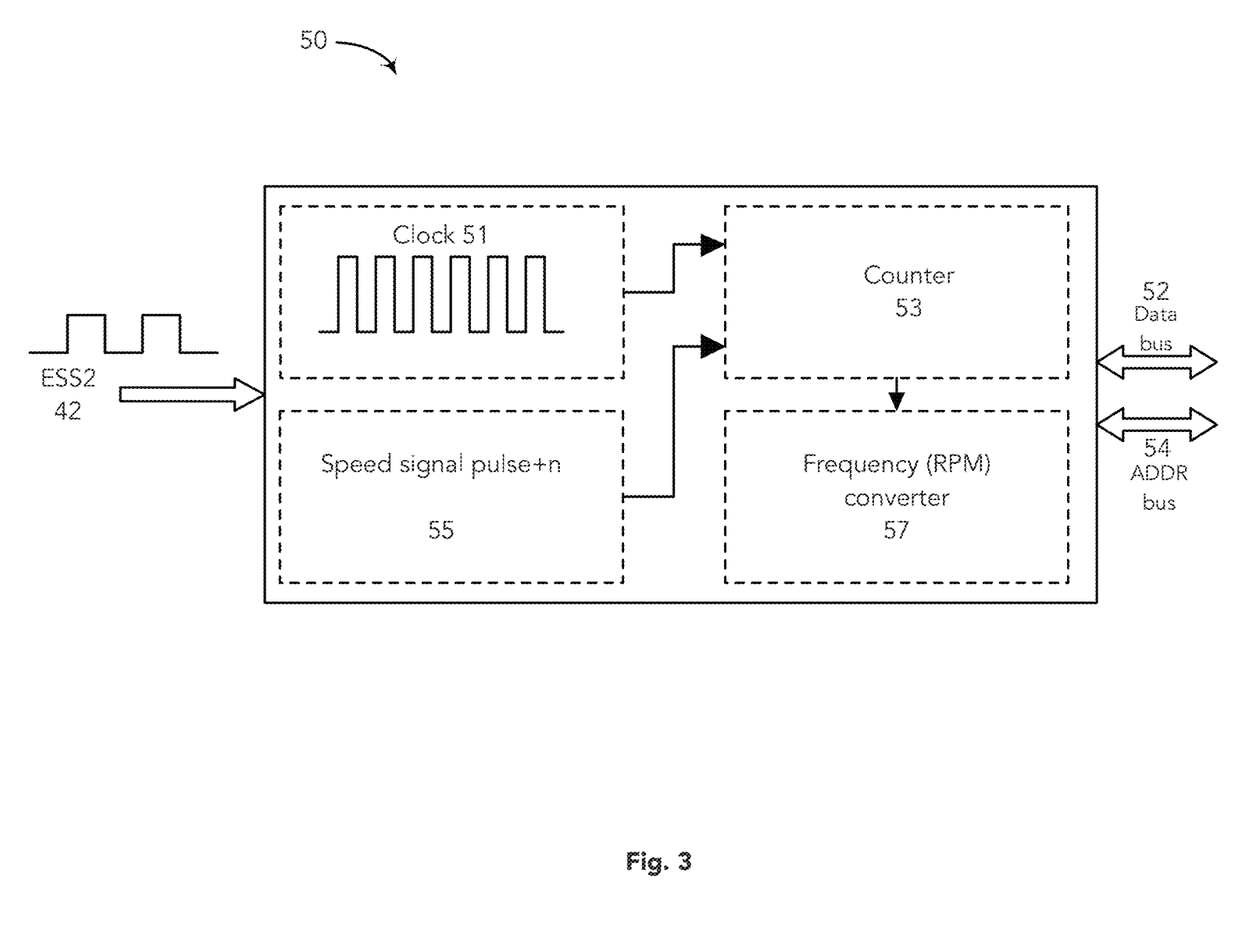
FIG. 3 illustrates an exemplary engine metering circuit and components.

FIG. 3 illustrates a detail of engine metering circuit 50, which receives an input ESS2 42 representing engine speed as mentioned herein. Engine metering circuit 50 can be generally viewed as a collection of interconnected components, including a clock generator 51, a speed signal pulse (÷n) component 55, both of which provide a signal to counter 53, which in turn provides an output signal to frequency (RPM) converter 57. FPGA engine metering circuit 50 is then coupled to DSP controller 60 as mentioned above.

Figure 4:
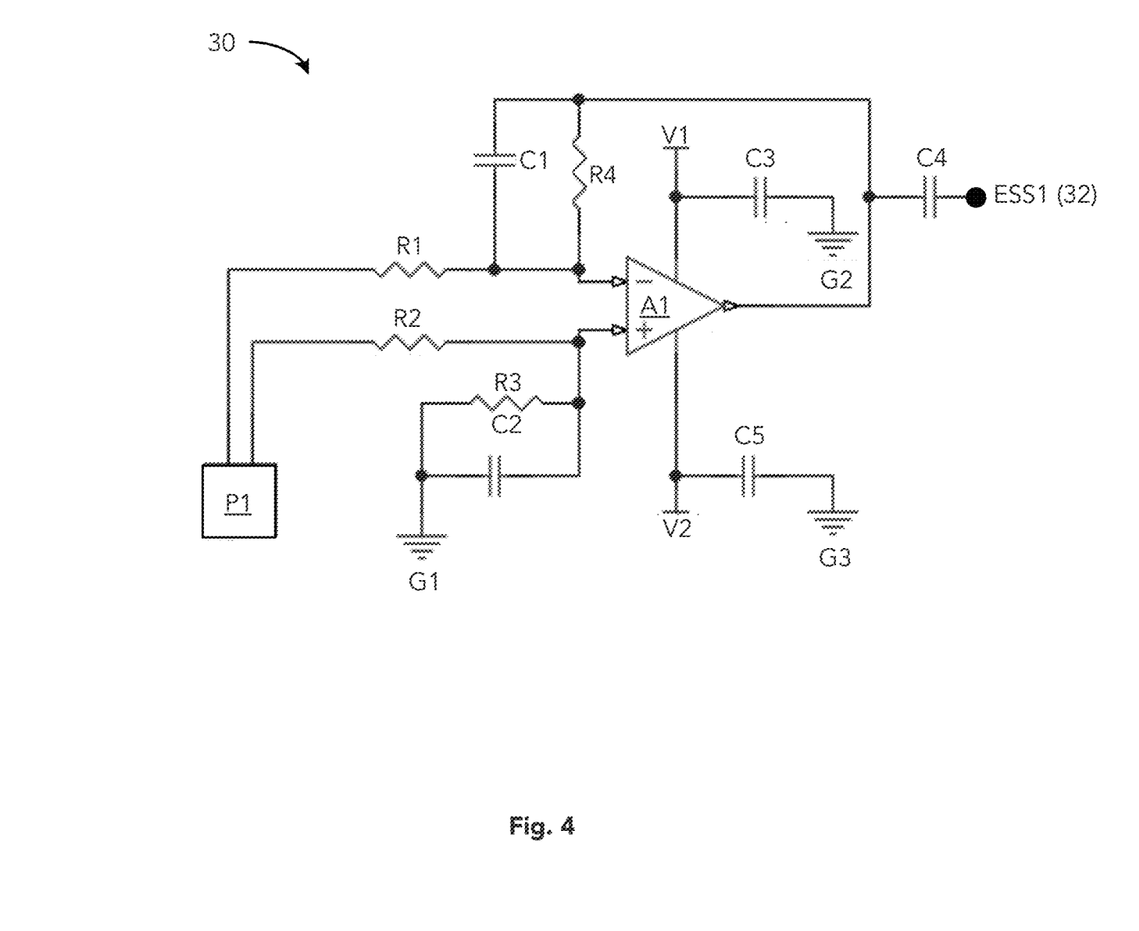
FIG. 4 illustrates an engine speed processor.

FIG. 4 illustrates an exemplary arrangement of engine speed processor or circuit 30 according to one or more embodiments of the present invention. Those skilled in the art will appreciate that equivalent and similar embodiments aside from the illustrative embodiments of the current examples can be implemented without loss of generality. Various implementations may depend on the specific applications at hand, design constraints, and other factors. Such other configurations and examples are meant to be reasonably comprehended by the scope of the present claims.

FIG. 4 illustrates a circuit configuration for an engine speed signal generator 30, which is part of the controller system 20. A two-pin input sensor or interface connector P1 is directly or indirectly coupled to an engine speed sensor. Power to circuit 30 is supplied at V1 and V2, which may be received in the form of a 15 Volt supply from a power supply bus or similar voltage reference source. A pair of balanced input resistors R1, R2 are disposed as shown between P1 and op amp A1. A first RC loop comprising resistor R4 and capacitor C1 is coupled to a first input (−) of op amp A1. A second RC loop comprising resistor R3 and capacitor C2 (grounded through G1) is coupled to a second input (+) of op amp A1. Capacitors C3 and C5 are disposed between voltage input points V1 and V2 and ground points G2 and G3, respectively. The output of op amp A1 representing a first engine speed signal (ESS1, 32) is delivered through capacitor C4 to input speed processor circuit 40.

Figure 5:
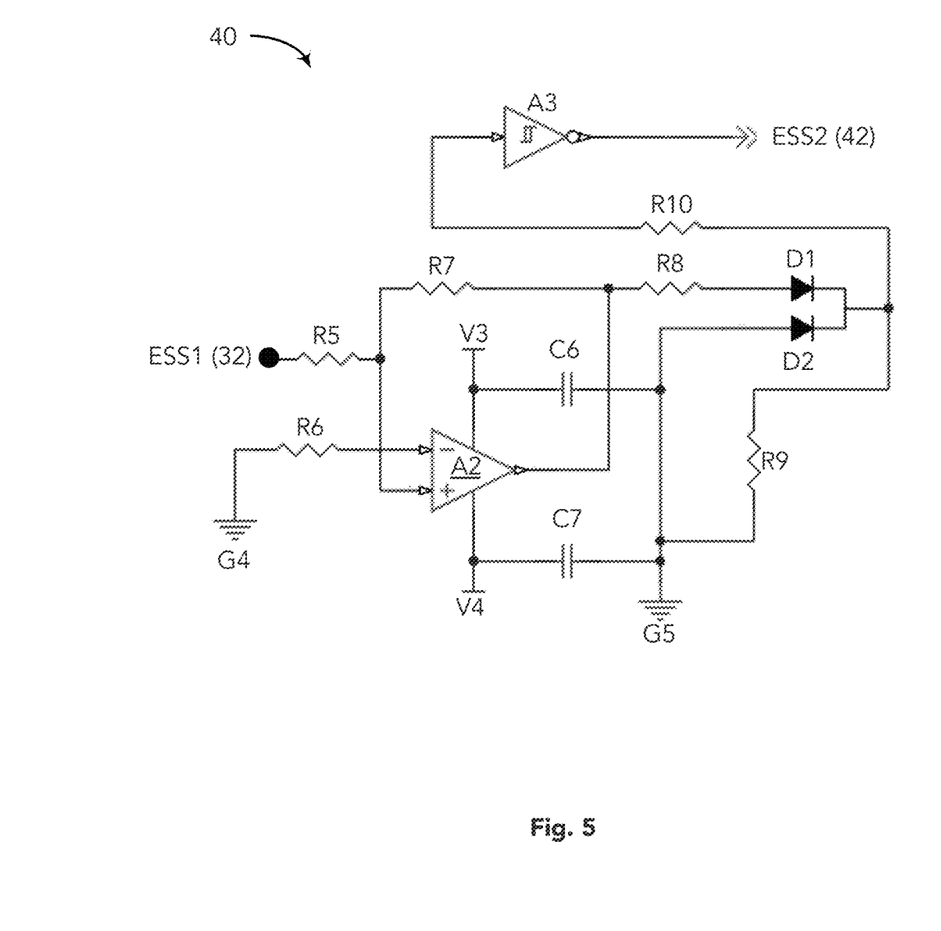
FIG. 5 illustrates an input speed processor.

FIG. 5 illustrates an engine input speed processing circuit 40, which is part of the controller system 20. The circuit 40 takes first engine speed signal ESS1, 32, which is referenced in the previous figures, through an input resistance R5. An output of R5 is fed into a first (+) input of op amp A2. The second input (−) of op amp A2 is coupled to ground G4 through resistance R6. A2 is further fed from source voltages V3 and V4, which are coupled to capacitors C6 and C7. An output of op amp A2 is delivered to a first diode D1 through resistor R8. A second diode D2 is coupled to ground at G5. The outputs of diodes D1 and D2 are connected and coupled back to ground G5 through resistor R9 as well as being coupled to the input of Schmitt trigger inverter A3 through resistor R10. Inverter A3 provides improved signal conditioning between the analog and digital portions of the controller circuit. Inverter A3 delivers an output ESS2, 42 of circuit 40, which is a second signal indicative of a speed of the engine. This second engine speed signal (ESS2) is usable as a speed input (SPEED_IN) signal for use in the FPGA circuit 50 below.

The FPGA processing circuit 50 is an integrated circuit (IC) having a multi-pin input/output circuit interface with the other components of controller 20. One input received by FPGA is the second engine speed signal ESS2, 42, described earlier and indicative of a rotational speed of the prime mover engine that is the subject of the present disclosure. Other electronic signals, clocking inputs and so on are also provided to engine metering circuit 50.

In an aspect, one mechanical rotation of a prime mover engine causes the speed sensor to generate a number "Q" of output electrical pulses, which can be over 100 such pulses. The number (Q) can then be divided by four (4) so as to ascertain the number of output pulses in a quarter-turn of the prime mover engine. This quarter-turn periodicity can then be correlated with clock counts, and, in an aspect to calculate the revolutions per minute (RPM) of the engine. Those skilled in the art will appreciate that other techniques for revolution counting and clocking and speed processing are possible, which are comprehended by this invention, and that this is but one exemplary technique for doing so.

The engine metering circuit 50, is coupled by one or more electronic busses to digital signal processor (DSP) controller circuit 60, which allow DSP 60 to access memory storage units or addresses on circuit 50. Engine metering circuit 50 may comprise a field programmable gate array (FPGA) circuit in one embodiment. In another embodiment, engine metering circuit 50 may comprise a reduced instruction set circuit (RISC).

In an example, provided here for the sake of illustration, two busses connect engine metering circuit 50 and DSP controller circuit 60. The first is a Data Bus 52 and the second is an address bus 54. The engine metering circuit 50 is configured to measure the engine speed and store that speed in a register (e.g., memory unit). The DSP controller circuit 60 can read the contents of this register through Data Bus 52 and Address Bus 54. Other information in the circuit 50 storage registers includes digital I/O status, AC line frequency, and circuit 50 program RPM data. In one configuration, the DSP controller circuit 60 comprises a TMS320 family DSP controller chip from Texas Instruments, or similar DSP chip. The DSP controller circuit 60 can be programmable with machine executable instructions such as a reduced instruction set allowing signal processing functions thereon. In an aspect, the DSP circuit 60 is coupled to the FPGA engine metering circuit 50 by way of the aforementioned buses 52 and 54. DSP controller 60 delivers CAN bus signal(s) 62, which include in some embodiments signals over a controller area network (CAN) bus. In an example, the CAN bus is compliant with ISO1050 described at, e.g., www.ti.com/lit/ds/symlink/iso1050.pdf.

Figure 6:
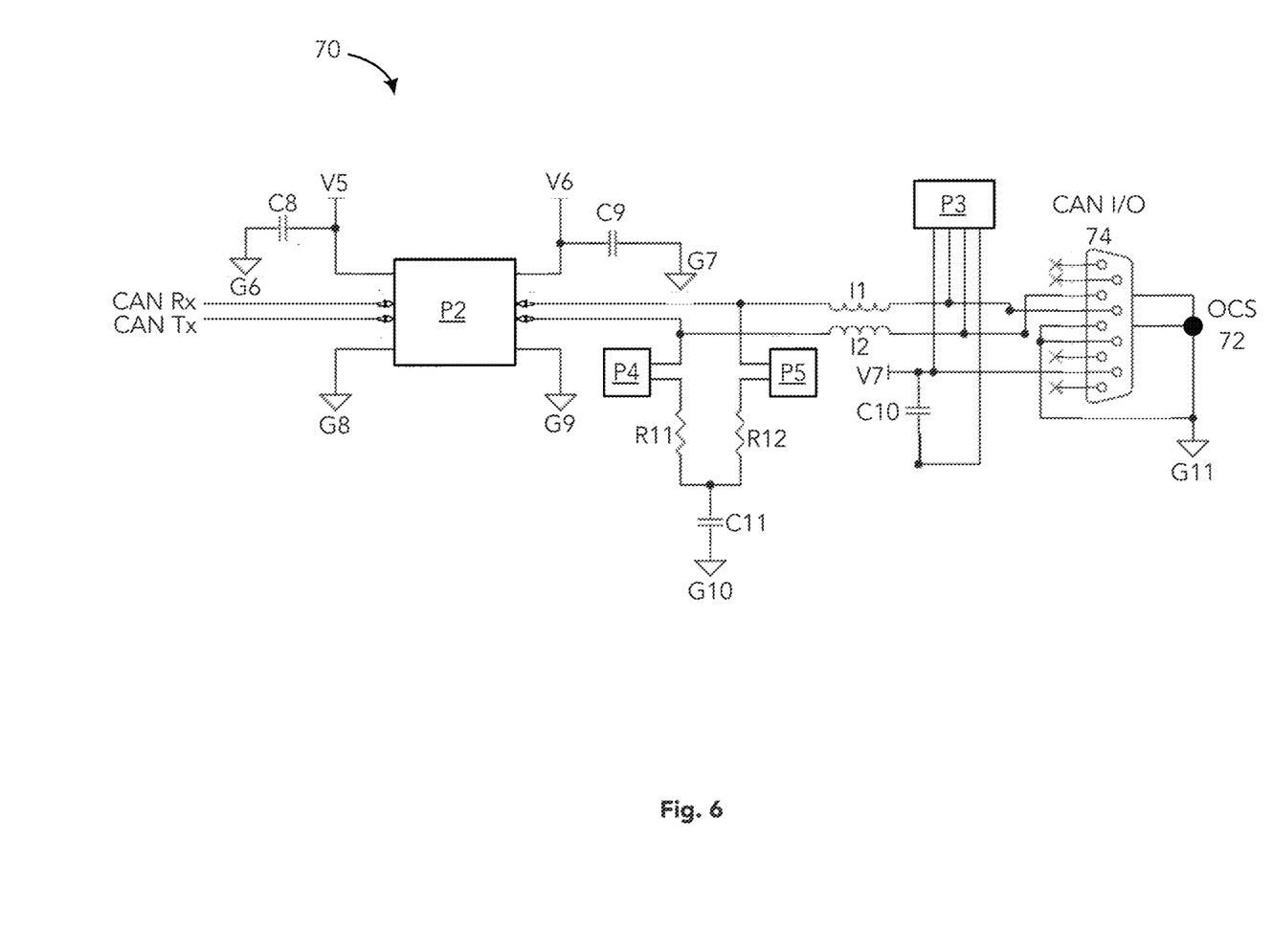
FIG. 6 illustrates a host communication interface.

FIG. 6 illustrates an exemplary host communication interface circuit 70, which is part of controller system 20. This portion of the controller receives CAN bus inputs (CAN Rx and CAN Tx) that receive and transmit signals from and to DSP controller 60 according to the suitable CAN signaling protocol (e.g., ISO1050). The CAN bus inputs are provided to respective pin connections on ISO1050 circuit (chip) P2. Other inputs to circuit P2 are voltage inputs V5 and V6, which are isolated from grounds G6 and G7 by capacitors C8 and C9, respectively. Circuit P2 is further grounded at ground connections G8 and G9 as shown. Circuit P2 provides CAN outputs to a pair of two-pin Headers P4 and P5, which in an embodiment provides a CAN Low (CANL) signal to Header P4 and inductor I2, and a CAN High (CANH) signal to Header P5 and inductor I1 as shown. Headers P4 and P5 are grounded through resistors R11 and R12, respectively, which are both in turn coupled to ground G10 through capacitor C11. Here, a header acts as a connector, and typically is a male connector. I1 and I2 can comprise one part in some embodiments, which is a common mode choke.

A four-pin Header P3 taps into the outputs of inductors I1, I2, and is further coupled to a voltage V7, across capacitor C10. The I1 and I2 output taps connected to four-pin Header P3 are further connected to respective pins of a multi-pin CAN input/output (I/O) communication connector 74. CAN I/O 74 is furthermore connected to ground G11. Finally, CAN I/O connector 74 provides an output communication signal (OCS) 72 which is used to control the speed of the prime mover engine-generator pair. Ground connection G11 on the figure indicates that the physical connector body is grounded.

Figure 7:
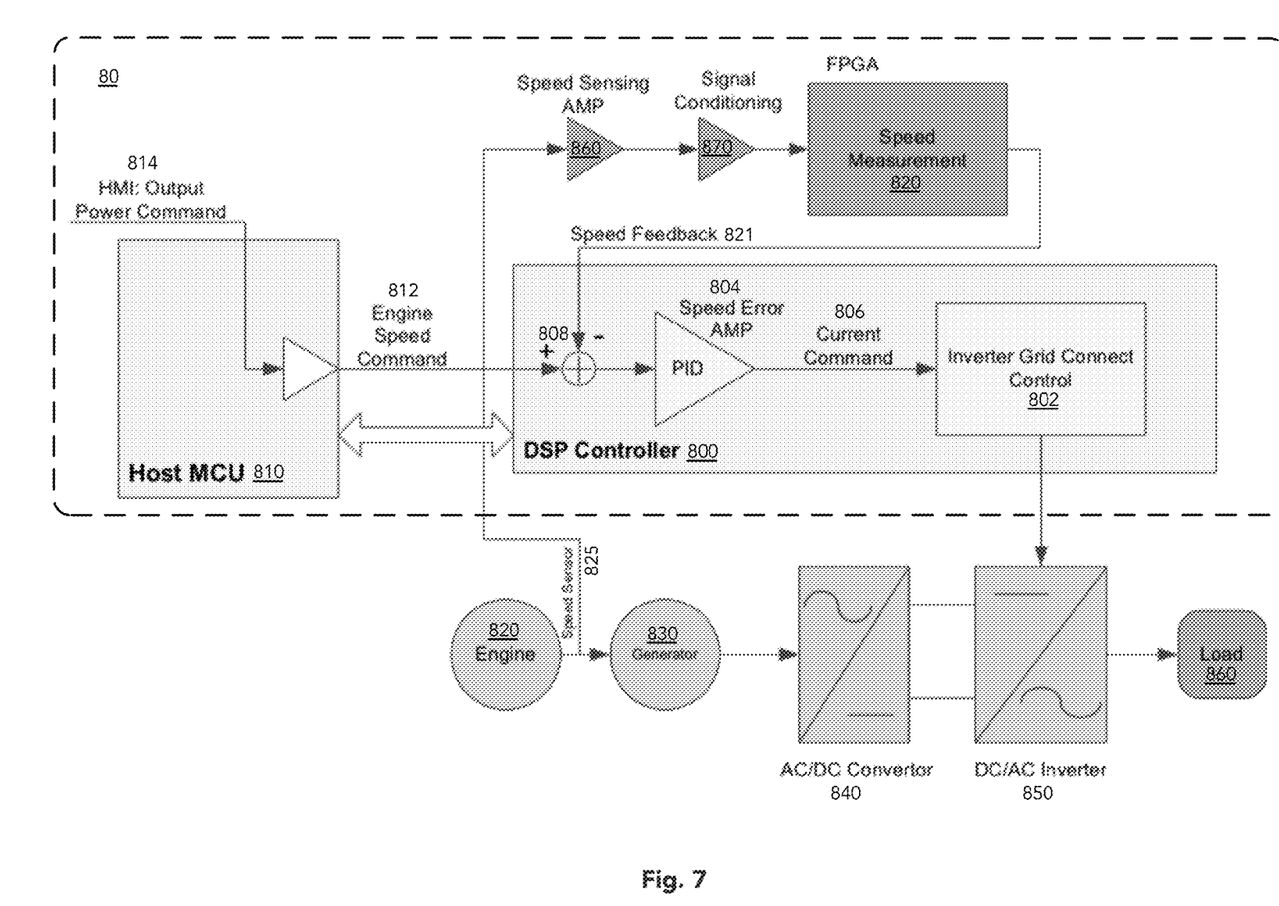
FIG. 7 illustrates a representation of an engine controller.

FIG. 7 illustrates an internal engine controller system 80 and circuitry according to an embodiment of the invention. The system 80 is used to control the operation, speed and other functional parameters of an engine-generator pair (e.g., 820, 830) used to generate electrical power to a load 860. Those skilled in the art would appreciate that equivalent implementations are possible by rearranging certain parts of the illustrated embodiment, which are comprehended by the attached claims. Also, the illustrated engine controller represents a simplification of detail that would be understood by those skilled in the art. For example, digital signal processing (DSP) and other controllers, amplifiers and processing units themselves include sub-components and circuits and logic blocks that are not illustrated in the present drawing but are understood to be a part thereof. These details can be modified and specifically called out parts could be substituted with similar or equivalent parts as necessary for a given application without loss of generality.

As described earlier, an engine or generator or shaft RPM sensor (generally, a speed sensor) 825 senses the rotational speed of an engine 820 and/or generator 830. The speed sensor 825 provides a signal corresponding to engine speed to speed sensing amplifier 860, which in turn provides an amplified engine speed signal to a signal conditioner 870. The output of signal conditioner 870 is provided to an engine speed measurement circuit 820, which may be implemented as a field programmable gate array (FPGA) architecture, but may also be implemented in other (e.g., RISC) configurations. The output of speed measurement FPGA 820 comprises a speed feedback signal 821.

Engine controller 80 includes a host microcontroller unit (MCU) 810 having a processor, and a digital signal processing (DSP) controller 800 and other engine speed measuring and signal handling components that receive an output power command or signal 814 and generate an engine speed command 812. It is noted that those of skill in the art can substitute the exemplary DSP in this embodiment with other architectures, e.g., general processor, graphics processor, etc.

The engine speed command and speed feedback signal 821 are provided to comparator 808 of DSP controller 800. The output of comparator 808 is delivered to a PID 804 which amplifies a speed error signal and generates an output current command 806 for use by an inverter grid connection controller 802.

Electrical generator 830 provides AC electrical power through AC/DC converter (ADC) 840 and controllable DC/AC inverter 850 to load 860.

Therefore, the engine speed is used, among other factors, to control an inverter by way of the above control circuit 80 so as to optimize the running of engine 820 and generator 830 and inverter 850, especially when engine 820 is operated in a full throttle mode or wide open throttle (WOT) mode of operation.

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A controller for controlling engine speed of a prime mover engine in an electrical generation system, comprising:
   a housing for containing a plurality of electrical parts of said controller;
   an engine speed processor that senses a movement of said prime mover engine and generates a first engine speed signal;
   an input speed processor that receives said first engine speed signal and generates a second engine speed signal corresponding at least in part to said first engine speed signal;
   an engine metering circuit that receives said second engine speed signal and relates said second engine speed signal to a clock signal and stores engine revolutions (RPM) and other data relating to the speed of said engine in at least one memory storage unit;
   a digital signal processor (DSP) controller coupled to said engine metering circuit by at least one multi-pin connection so as to permit said DSP to access said at least one memory storage unit on said engine metering circuit; and
   a host communication interface receiving signals from said DSP over a communication bus and further providing an output control signal for controlling the speed of said engine.

2. The controller of claim 1, wherein said engine metering circuit comprises a field programmable gate array (FPGA) circuit having machine readable instructions programmed thereon.

3. The controller of claim 2, said engine metering circuit further comprising a digital clock, a counter and a frequency converter thereon.

4. The controller of claim 1, said engine speed processor comprising an engine speed sensor that includes a first operational amplifier receiving an engine speed sensor input and a respective reference voltage and generating an output based on said inputs of the first operational amplifier of said engine speed processor operational amplifier.

5. The controller of claim 1, said input speed processor comprising a second operational amplifier receiving said first engine speed signal and a respective reference voltage and generating an output based on said inputs of the second operational amplifier of said input speed processor operational amplifier.

6. The controller of claim 1, said digital signal processor (DSP) controller receiving an engine speed command from a host processor and a speed feedback signal from said engine metering circuit, at a comparator of said DSP controller, an output of said comparator being delivered to a speed error amplifier of said DSP controller, which in turn provides an output to an inverter grid connect controller.

7. The controller of claim 6, said inverter grid connect controller providing an output to a DC-to-AC inverter coupled to an electrical load.

* * * * *